US011304033B2

(12) United States Patent
Chiu et al.

(10) Patent No.: US 11,304,033 B2
(45) Date of Patent: Apr. 12, 2022

(54) CONTEXT-BASED DISABLING WIRELESS RADIOS WHILE ON AN AIRPLANE

(71) Applicant: Apple Inc., Cupertino, CA (US)

(72) Inventors: Ping-Ko Chiu, Santa Clara, CA (US); Benjamin A. Detwiler, Menlo Park, CA (US); Stephen P. Jackson, San Francisco, CA (US); Robert W. Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/032,798

(22) Filed: Sep. 25, 2020

(65) Prior Publication Data

US 2021/0099839 A1    Apr. 1, 2021

Related U.S. Application Data

(60) Provisional application No. 62/907,372, filed on Sep. 27, 2019.

(51) Int. Cl.
*H04W 4/029* (2018.01)
*G01S 5/02* (2010.01)
*G01C 5/06* (2006.01)
*H04W 4/80* (2018.01)
*H04W 84/12* (2009.01)

(52) U.S. Cl.
CPC ......... *H04W 4/029* (2018.02); *G01S 5/02527* (2020.05); *G01C 5/06* (2013.01); *H04W 4/80* (2018.02); *H04W 84/12* (2013.01)

(58) Field of Classification Search
CPC ......... G06N 20/00; H04L 67/22; H04W 4/02; H04W 4/029; H04W 48/04; H04W 4/027; H04W 4/80
See application file for complete search history.

(56) References Cited

U.S. PATENT DOCUMENTS

| | | | |
|---|---|---|---|
| 8,849,308 B2 * | 9/2014 | Marti | G01C 21/206 455/456.2 |
| 8,934,921 B2 * | 1/2015 | Marti | G01C 21/10 455/456.2 |
| 9,401,769 B2 | 7/2016 | Mayor et al. | |
| 9,408,178 B2 * | 8/2016 | Mayor | H04W 64/003 |
| 9,535,163 B2 | 1/2017 | MacGougan et al. | |
| 9,798,011 B2 | 10/2017 | MacGougan et al. | |
| 10,042,035 B2 | 8/2018 | Grosman et al. | |
| 10,165,399 B2 | 12/2018 | Huang et al. | |
| 10,349,374 B2 | 7/2019 | Mayor et al. | |
| 2011/0241827 A1 * | 10/2011 | Varoglu | H04B 7/185 340/5.52 |
| 2012/0170560 A1 * | 7/2012 | Han | H04W 64/00 370/338 |
| 2013/0012181 A1 * | 1/2013 | Jeon | H04W 88/02 455/418 |

(Continued)

*Primary Examiner* — Dung Hong
(74) *Attorney, Agent, or Firm* — Aikin & Gallant, LLP

(57) ABSTRACT

Embodiments described herein provide for an electronic device comprising a set of classifiers that can determine whether the electronic device is likely on an airplane. Upon a determination that the electronic device is likely on an airplane, one or more wireless radios on the electronic device (e.g., an ultra-wideband ranging radio, a cellular radio, etc.) may be disabled or a prompt can be displayed to enable a user to place the device into airplane mode.

20 Claims, 12 Drawing Sheets

(56) References Cited

U.S. PATENT DOCUMENTS

| | | | |
|---|---|---|---|
| 2014/0075352 A1* | 3/2014 | Hansen | H04M 1/7243 715/765 |
| 2014/0082384 A1* | 3/2014 | De Cesare | G06F 11/3438 713/320 |
| 2014/0187177 A1* | 7/2014 | Sridhara | G06N 5/003 455/73 |
| 2014/0237595 A1* | 8/2014 | Sridhara | G06F 21/55 726/23 |
| 2015/0017967 A1* | 1/2015 | Cao | H04W 8/22 455/418 |
| 2016/0106368 A1* | 4/2016 | Wu | G01P 13/00 702/50 |
| 2016/0357163 A1* | 12/2016 | Marti | G05B 15/02 |
| 2018/0338245 A1 | 11/2018 | Tam et al. | |
| 2019/0094387 A1 | 3/2019 | Miller et al. | |
| 2019/0137621 A1 | 5/2019 | Zhang et al. | |
| 2020/0045164 A1* | 2/2020 | Kwatra | H04M 1/72463 |
| 2020/0065682 A1* | 2/2020 | Paulina | G16H 20/70 |

\* cited by examiner

CONTEXT-BASED DISABLING WIRELESS RADIOS WHILE ON AN AIRPLANE

CROSS-REFERENCE

The present application claims priority to U.S. Provisional Application No. 62/907,372 filed Sep. 27, 2019, which is hereby incorporated by reference.

FIELD

Embodiments described herein relate generally to location determination for mobile wireless devices and accessories. More specifically, embodiments relate to techniques to facilitate the context-based disabling of wireless radios, such as an ultra-wide band radio, on a wireless device or accessories upon detection that the device is on an airplane.

BACKGROUND OF THE DESCRIPTION

A portable multifunction device can incorporate voice and/or data communication functionality that enables the device to establish a network connection with a voice and/or data network. In some jurisdictions, flight regulations require passengers on commercial flights to disable some communications functionality on those devices. Communications functionality is disabled, for example, to limit the potential inference to airplane flight or communications systems that may be caused by radio transmissions of passenger devices. To facilitate the at least limited use of such devices on airplanes, many portable multifunction device include a mode, typically called "airplane mode," in which at least a portion of the radio transmission functionality on the device is disabled or limited, while allowing other functions of the device (e.g., a music player) to be used. Where flight regulations require entry into airplane mode during flight, entry into the airplane mode is a manual determination performed by a user of the portable multifunction device. Devices can differ in the number and type of radio frequency transmitters that are included on the device. Additionally, the specific set of communications functions that are disabled automatically when entering airplane mode can vary across devices.

SUMMARY OF THE DESCRIPTION

Embodiments described herein provide for an electronic device comprising a set of classifiers that can determine whether the electronic device is likely on an airplane. Upon a determination that the electronic device is likely on an airplane, one or more wireless radios on the electronic device (e.g., an ultra-wideband ranging radio, a cellular radio, etc.) may be disabled or a prompt can be displayed to enable a user to place the device into airplane mode.

One embodiment provides for a method comprising, on an electronic device having a wireless processor coupled with a wireless radio, scanning a wireless radio environment near an electronic device to gather wireless radio environment data. The method additionally includes gathering sensor data detected by sensors of the electronic device, retrieving location metadata for one or more location estimates for the electronic device, and providing the wireless radio environment data, sensor data, and location metadata to a coarse airplane classifier on the electronic device. The coarse airplane classifier can determine a classification for wireless signals detected during the scan of the wireless radio environment. The classification can indicate whether a wireless signal detected during the scan is associated with an airplane. The method additionally includes reporting hardware addresses for wireless signals detected within the scan of the wireless radio environment and classifications associated with the wireless signals to a server. The server can use the reported data to generate map metadata including reporting hardware addresses for wireless signals and an associated classification that indicates whether a wireless signal is likely associated with an airplane.

One embodiment provides for an electronic device comprising a wireless processor coupled with a wireless radio, the wireless processor to determine, via the wireless radio, data for a wireless radio environment near the electronic device, sensors to gather sensor data from a physical environment near the electronic device, a location determination system to determine a geographic location of the electronic device, a memory, and one or more processors to execute instructions stored in the memory. The instructions, when executed cause the one or more processors retrieve location metadata for the geographic location of the electronic device, where the location metadata includes map tile metadata and an airplane hardware address tile. The airplane hardware address tile includes a set of hardware addresses associated with a wireless access point of an airplane. The one or more processors are further to process the data for the wireless radio environment, the sensor data, the location metadata, and the airplane hardware address tile via a real-time airplane classifier on the electronic device to determine whether the electronic device is likely on an airplane and disable one or more wireless radios on the electronic device based on a determination that the electronic device is likely on an airplane.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present description is illustrated by way of example and not limitation in the figures of the accompanying drawings in which like references indicate similar elements, and in which.

DETAILED DESCRIPTION

Figure 1:
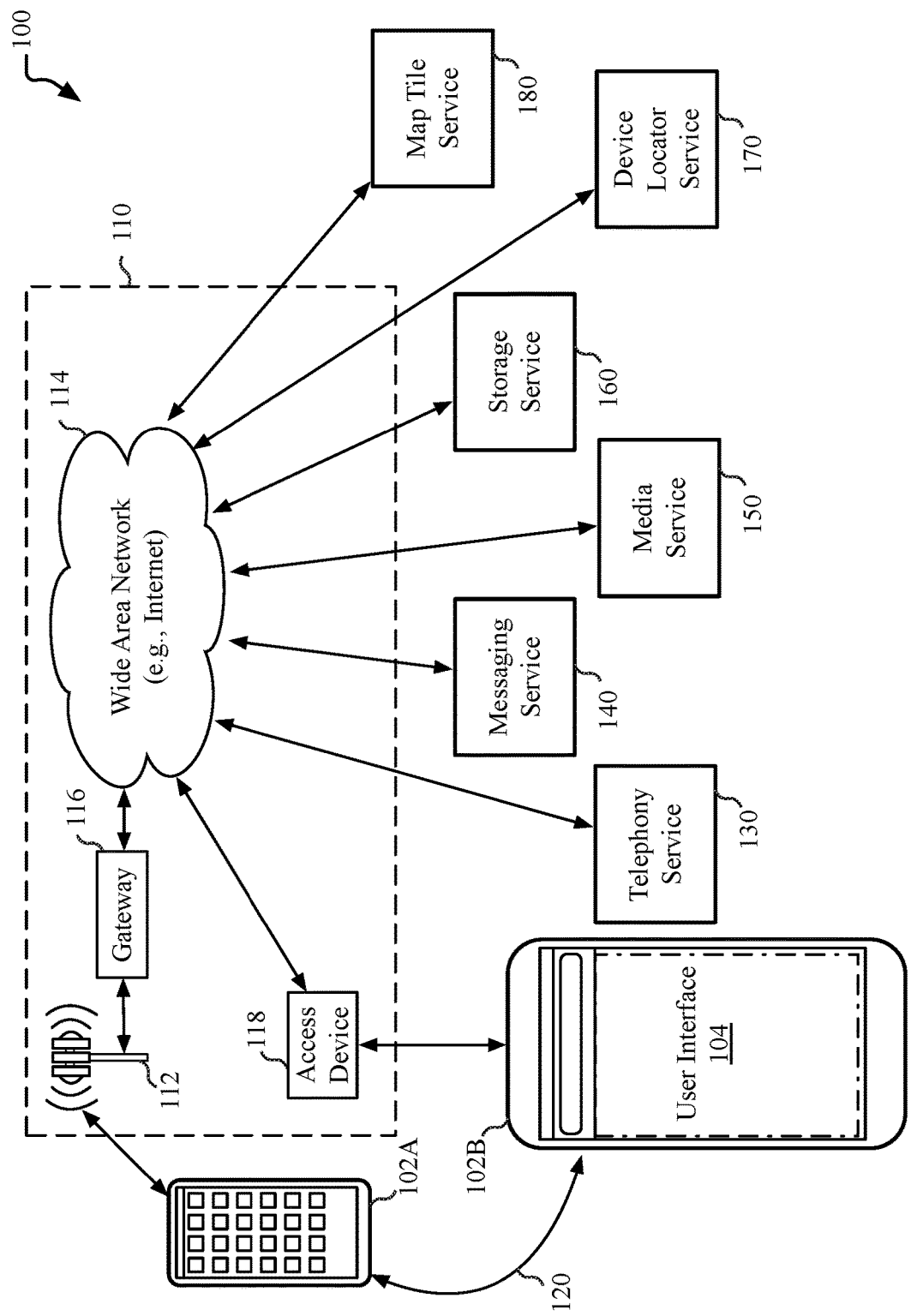
FIG. 1 is a block diagram of a network operating environment for mobile devices, according to an embodiment.

Embodiments described herein provide for an electronic device comprising a wireless processor coupled with one or more wireless radios, memory to store instructions, and one or more processors to execute the instructions. The instructions can configure the electronic device to perform operations to facilitate the disabling one or more wireless radios while on an airplane, such as, for example, ultra-wideband radio transceivers that are used to enable wireless ranging functionality. The electronic device can be configured to automatically disable one or more radios when the electronic device detects that the device is inside of an airplane.

Airplane detection can be performed using a classifier on the electronic device that can analyze a set of incoming data to determine a likelihood that the electronic device is currently inside of an airplane that is in flight. In various embodiments, the set of incoming data includes barometric sensor data, radio frequency signal environment data, user or device context data, location data, and digital elevation model (DEM) information that is associated with the location data. The barometric sensor data can be used to determine if the electronic device is in an environment that is consistent with the inside of an airplane. The radio frequency data can be used to determine if the radio frequency signal environment is consistent with that of an airplane. Location data can be used to determine whether a user of the electronic device is likely to have boarded an airplane. DEM data for a location of the electronic device can be used in conjunction with barometric data to determine that the electronic device is at an altitude that is inconsistent with the expected elevation of the estimated location of the electronic device.

In one embodiment the accuracy of airplane detection is enhanced by a client and server infrastructure that enables the recognition of hardware addresses (e.g., a media access control address) associated with wireless access points that may associated with an airport or airplane-based wireless network. A client device can download a list of wireless access points that have been classified as airport or airplane-based wireless access points. If the device detects an airplane-based wireless access point, the classifier on the electronic device can determine that the electronic device may be more likely to be inside of an airplane. A server infrastructure can aggregate wireless radio hardware addresses for known or potential airplane wireless access points that are provided by multiple client devices. The server infrastructure can provide a list of wireless radio hardware addresses to client devices to assist the classifiers on the device with the airplane detection process. In one embodiment, the list of wireless radio hardware addresses is a list of MAC addresses of known or potential airplane wireless access points. The list of MAC addresses can be provided to the various client devices as map tile metadata for the current geographic location of the electronic device. The list of addresses can be a master-list of MAC addresses or can be a filtered list that includes only the MAC addresses that are relevant for the current geographic location of the wireless device.

In one embodiment, the airplane detection process is a staged process that is triggered based on the occurrence of one or more triggering events. Exemplary trigger events can be entering map tile or geographic region associated with an airport and detecting, during a Wi-Fi scan, a wireless access point known to be associated with an airport or airplane. In one embodiment at least a portion of the airplane detection logic is continuously executed. For example, a barometric sensor can be continuously monitored to gather baseline pressure data and to detect a change in the pressure environment that indicates that the electronic device may be in an airplane in flight.

In one embodiment an airplane mode configuration graphical interface is provided by an electronic device to enable a user to configure airplane settings for the electronic device. The airplane mode configuration graphical interface can enable a user to enter or exit airplane mode or explicitly disable one or more wireless radios on the electronic device, such as but not limited to ultra-wideband ranging radios or other radios (e.g., cellular network radios). The airplane mode configuration graphical interface can be triggered upon a determination that a user is likely within an airplane and the user can be prompted to enter airplane mode or explicitly disable one or more radios. In one embodiment the electronic device can be configured to automatically disable one or more radios upon a determination that a user is within an airplane. The automatic disabling of one or more radios can be activated or deactivated by the user, for example, via the airplane mode configuration graphical interface or another setting or configuration interface. When automatic disabling of the one or more radios is enabled, the one or more selected radios can be automatically disabled or airplane mode can be automatically entered upon the determination that the electronic device is within an airplane. Such automatic disabling or the automatic entry into airplane mode can be accompanied by a notification that is presented to the user that one or more radios have been disabled or that airplane mode has been entered. The user can select the notification to open the airplane mode configuration graphical interface and adjust the radio configuration for the electronic device.

The terminology used in this description is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

System Overview

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, a device locator service 170, and a map tile service 180 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. For example, mobile device 102A can perform a location query for mobile device 102B. The device locator service 170 can also enable location queries for devices that do not have a network connection via the use of a network of finder devices. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B.

The map tile service 180 can be provided to the mobile devices 102A-102B by a set of servers. The map tile service 180 can provide a tile-based mapping service to the mobile devices 102A-102B that enables the mobile devices 102A-102B to retrieve map data and metadata for a geographic region of the mobile devices 102A-102B or a region that is being searched by the mobile devices 102A-102B. The map data in each tile can include, for example, information that can be used to display or render at least a portion of a map of a geographic region and/or metadata associated with the geographic region. The map data for a tile can also include blueprints of a building or venue, information about pathways within a building or venue, and a location fingerprint database. The location fingerprint database can include a radio frequency heat map that shows the radio frequency signatures for a given location. The radio frequency signatures can include signatures of Wi-Fi signals, Bluetooth signals, and other type of radio frequency signals. In one embodiment the map tile service 180 can also provide metadata for a map tile that includes a list of MAC addresses that have been determined to be associated with airport and airplane wireless access points. The list of MAC addresses that have been classified as being associated with airport wireless access points can be used to indicate to the mobile devices 102A-102B that the user of the mobile device may be about to board an airplane. The list of MAC addresses that have been determined to be associated with airplane wireless access points can be used to indicate to the mobile devices 102A-102B to that the devices may be within an airplane. The list of airplane access point MAC addresses can be used along with other information (e.g., device context, user context, geographic location, barometric pressure data) to enable the mobile devices 102A-102B to determine whether to automatically disable one or more radios, automatically enter an airplane mode or prompt a user to disable one or more radios or place the device an airplane mode.

Airplane detection can be enabled for all radios of a device or for specific radios of a device. In one embodiment airplane detection and the prompting or automatic disabling of radios is performed for ultra-wideband ranging radios that may be found on the mobile devices 102A-102B.

Figure 2:
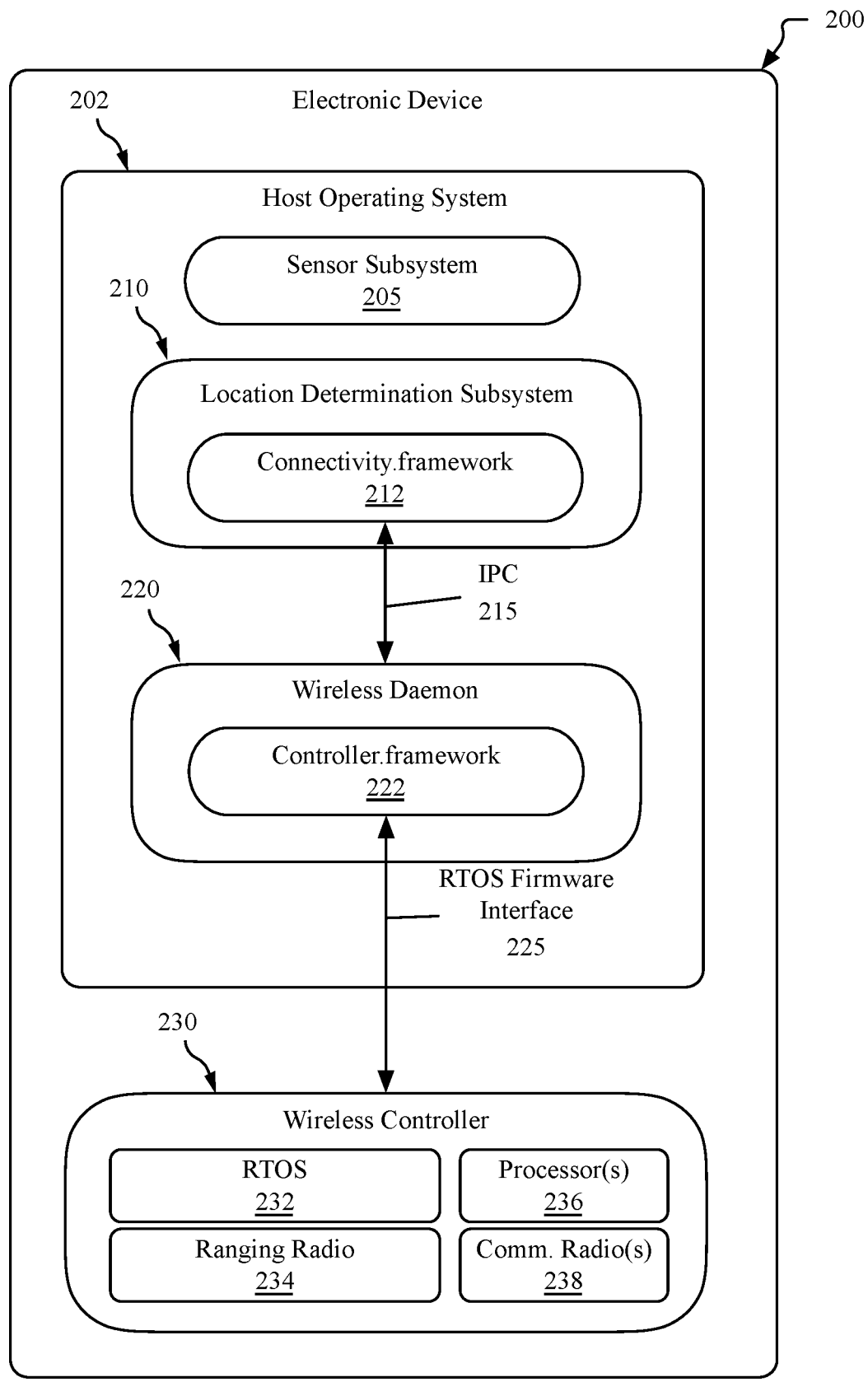
FIG. 2 illustrates an electronic device that includes multiple wireless radios that can be disabled using airplane detection.

FIG. 2 illustrates an electronic device 200 that includes multiple wireless radios that can be disabled using airplane detection. In one embodiment the electronic device 200 includes a host operating system 202 that executes on one or more application processors of a device. The electronic device 200 also includes a wireless controller 230, which can couple with one or more wireless radios and wireless antennas. The host operating system 202 includes a sensor subsystem 205, a location determination subsystem 210, and a wireless daemon 220. The sensor subsystem 205 receives data from sensors on the electronic device, including but not limited to barometric pressure sensors. The location determination subsystem 210 can facilitate the location estimation for the electronic device 200 via a satellite-based positioning system or a terrestrial positioning system that enables location estimation via detection of wireless signals near the electronic device. The location determination subsystem 210 can include libraries and resources associated a connectivity framework 212. The connectivity framework 212 presents program interfaces that enable the location determination subsystem 210 to communicate with a wireless daemon 220 via inter-process communication (IPC 215) messages. The wireless daemon 220 can include a controller framework 222 that enables the wireless daemon 220 to communicate with the wireless controller 230 on the device via a real-time operating system (RTOS) firmware interface 225.

In one embodiment the wireless controller 230 can execute a separate real-time operating system (RTOS 232) on one or more processors 236 of the controller. The one or more processors 236 of the wireless controller 230 are separate from the application processor that executes the host operating system 202. In one embodiment the one or more processors 236 includes secure memory, cryptographic accelerators, and other components that enables the wireless controller 230 to perform secure ranging operations using a ranging radio 234. For example, the one or more processors 236 can include a secure processor, such as a secure element processor (SEP).

The ranging radio 234 can include an ultra-wideband transceiver that can transmit and receive ultra-wideband radio signals. In one embodiment the wireless controller also includes one or more wireless communications radios 238 that enables the wireless controller to facilitate communication with other devices using one or more wireless communication or networking protocols, such as Wi-Fi, Bluetooth, or NFC. Metrics associated with signals received by the wireless communications radio 238 can also be used as one aspect of a ranging process performed by the electronic device 200.

The ranging radio 234 and one or more wireless communications radios 238 may be disabled when the electronic device is placed into airplane mode. Additionally, the ranging radio 234 and one or more wireless communications radios 238 can be individually and explicitly enabled or disabled. Techniques described herein enable the ranging radio 234 and/or one or more one or more wireless communications radios 238 to be automatically disabled when the electronic device 200 determines that the device is within an airplane or to enable the electronic device 200 to prompt a user to enter airplane mode or otherwise disable the ranging radio 234 and/or one or more wireless communications radios 238.

Figure 3:
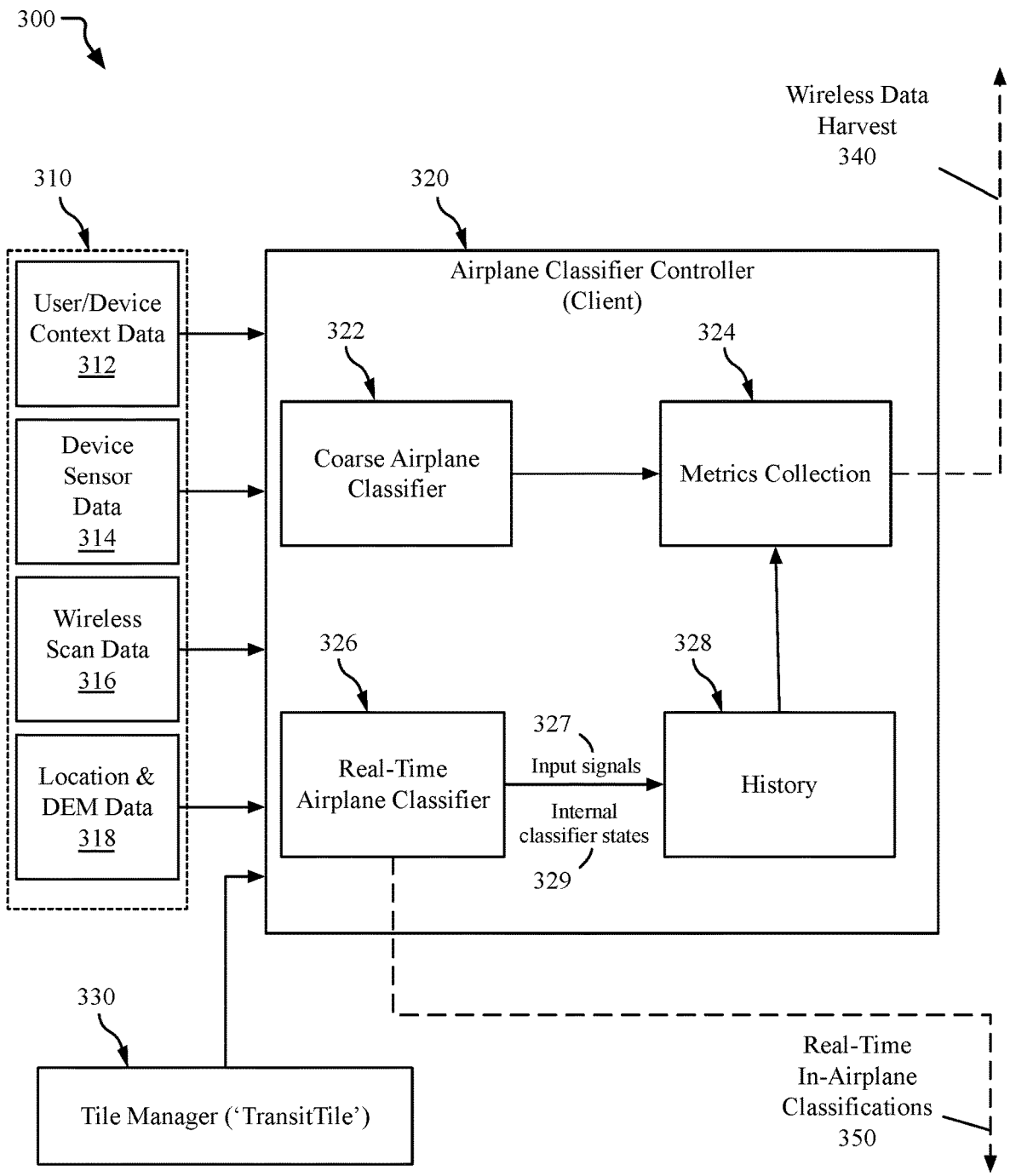
FIG. 3 illustrates a system on an electronic device to perform coarse and real-time airplane classification, according to an embodiment.

FIG. 3 illustrates a system 300 on an electronic device to perform coarse and real-time airplane classification, according to an embodiment. The system includes set of input data sources 310, an airplane classifier controller 320, and a tile manager 330. In one embodiment the input data sources 310 include user/device context data 312, device sensor data 314, wireless scan data 316, and location & DEM data 318. The set of input data sources 310 can provide data that is used by the airplane classifier controller 320.

The airplane classifier controller 320 includes a coarse airplane classifier 322 and a real-time airplane classifier 326. The coarse airplane classifier 322 can perform, via a coarse airplane classifier 322, coarse airplane classifications of wireless access points that are determined to be potentially associated with an airplane. Classifications generated by the coarse airplane classifier 322 can be provided to a metrics collection unit 324 for data collection and processing, along with a history of real-time in-airplane classifications 350 generated by the real-time airplane classifier 326. The real-time in-airplane classifications 350 are used to determine whether to disable one or more wireless radios of the electronic device, to prompt a user to disable the one or more radios, or to prompt the user to enter airplane mode on the electronic device. Input signals 327 from the set of input data sources 310 and determined internal classifier states 329 can be stored in a history buffer 328. Data from the history buffer 328 can be provided to the metrics collection unit 324 for processing along with data from the coarse airplane classifier 322. The metrics collection unit 324 can collect output from the coarse airplane classifier 322 for detected wireless access points, gather metrics related to the set of input data sources 310, and read classification history from the history buffer 328.

The airplane classifier controller 320 on the client electronic device can generate data for a wireless data harvest 340 to be provided to a server infrastructure. The wireless data harvest 340 can be generated based on the combination of data generated by the coarse airplane classifier 322, metrics collected by the metrics collection unit 324, and the history of real-time classifications stored within the history buffer 328. For example, wireless data harvest 340 can be provided to a server system 400 shown FIG. 4 to generate transit tile data that can be retrieved by the tile manager 330. The tile manager 330 can retrieve the transit tile data from a transit tile metadata server (e.g., map tile data server 440 shown in FIG. 4) and includes a set of hardware addresses (e.g., MAC addresses) for airplane wireless access points. The set of hardware addresses for airplane wireless access points can be used by the real-time airplane classifier 326 during the classification process to generate real-time in-airplane classifications 350. Details of the coarse and real-time airplane classifier process is described below with respect to FIG. 5A-5B.

Figure 4:
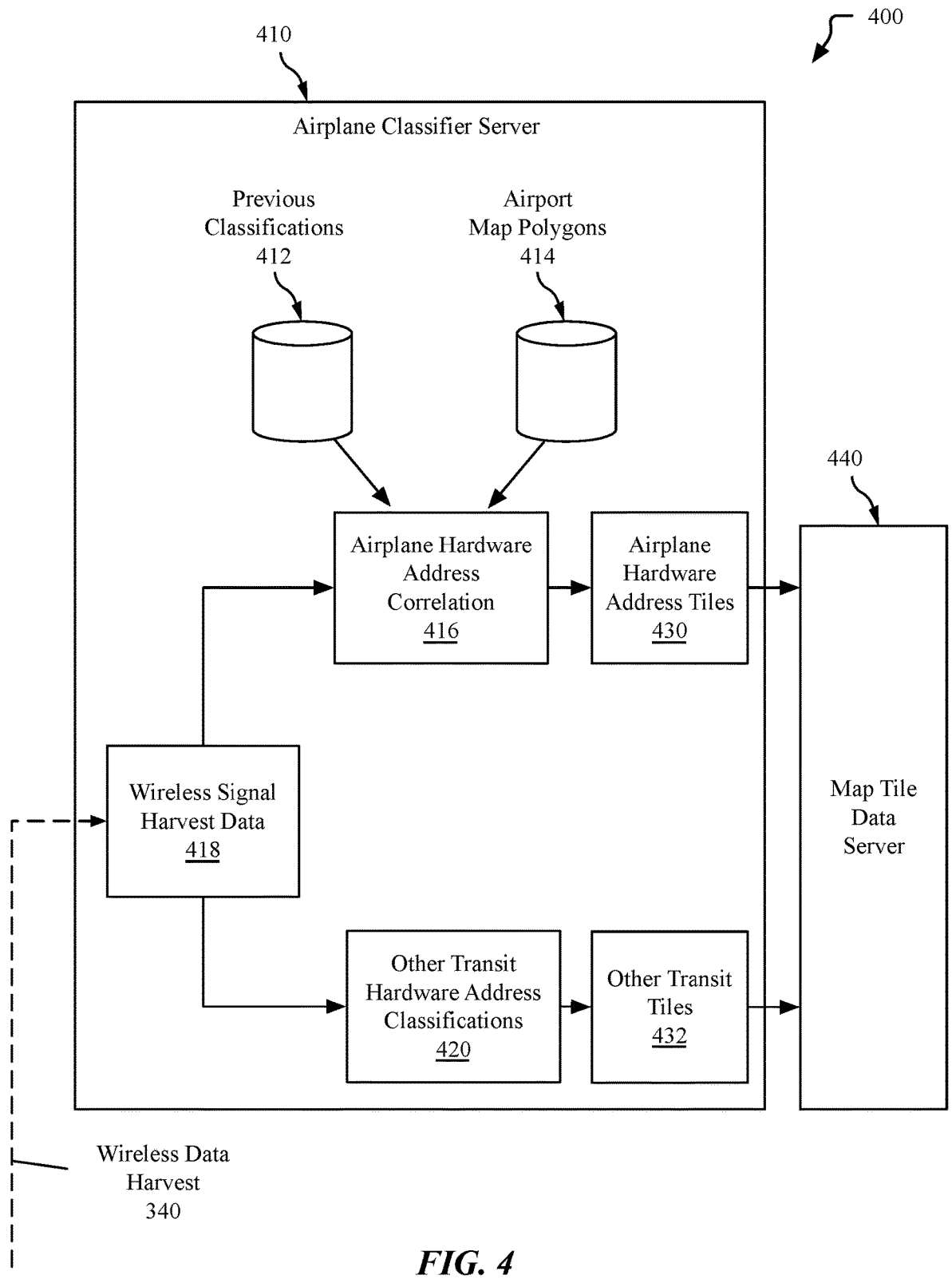
FIG. 4 illustrates a server system that provides data to facilitate in-airplane detection for an electronic device, according to an embodiment.

FIG. 4 illustrates a server system 400 that provides data to facilitate in-airplane detection for an electronic device, according to an embodiment. The server system 400 includes an airplane classifier server 410 and a map tile data server 440. The map tile data server 440 can be, for example, a server within a content delivery network. The airplane classifier server 410 can be a server within a cluster of servers or a cloud-based server.

The airplane classifier server 410 aggregates data from a wireless data harvest 340 received from client devices into wireless signal harvest data 418. In one embodiment the wireless signal harvest data 418 includes wireless scan data (e.g., wireless scan data 316 of FIG. 3), classifier results for the hardware addresses within the wireless scan data, and metrics associated with those hardware addresses. Non-airport related wireless data can be provided to a set of other transit hardware address classifications 420 and used to generate other transit tiles 432. The other transit hardware address classifications 420 can include to wireless access points that classified as related to other transit mechanisms (e.g., Bus, Train, Ferry, etc.). The other transit tiles 432 can contain metadata related to wireless access points that are associated with those other transit mechanisms.

Hardware addresses within the wireless signal harvest data 418 that have been classified as airport or airplane related can be read by the airplane hardware address correlation unit 416. The airplane hardware address correlation unit 416 can combine newly harvested classifications, previous classifications 412, and airport map polygons 414 to generate airplane hardware address tiles 430 that include, for example, a set of MAC addresses for airplane or airport-based access points. The airplane hardware address tiles 430 include data for wireless access points that have been detected in the geographic location associated with the airport map polygons 414, as well as a classification for those hardware addresses (e.g., airport, airplane). The airplane hardware address tiles 430 and other transit tiles 432 can be provided to the map tile data server 440. The map tile data server 440 can store a database, datastore, or key-value store of map tile data that can be queried by client devices. The airplane hardware address tiles 430 can be associated with airport polygons in the mapping database and retrieved as metadata for those polygons when the electronic device enters the geographic region of an airport.

In one embodiment, the airplane hardware address correlation unit 416 can scan the wireless signal harvest data 418 to detect potential hardware addresses for airplane wireless access points. Hardware addresses for potential airplane wireless access points can be determined by determining the set of hardware addresses that are regularly observed at multiple airport map polygons. A time series of observations of particular hardware addresses at various locations can enable the airplane classifier server 410 to classify those hardware addresses as associated with airplane-based wireless access points. This time series of observations can also be used to learn the pattern of a particular aircraft and predict location, routes, and duration of flight to improve the ability of the real-time airplane classifier to engage and disengage airplane mode. If a set of hardware address is determined to be moving between airport polygons, it is probable that those hardware addresses are associated with in-airplane wireless access points. Likewise, if multiple client devices detect stationary wireless access points within an airport polygon, those access point hardware addresses are likely associated with the airport within that airport polygon. It will be noted that each passenger may carry multiple devices. Each device of a passenger can submit independent observations of the same hardware address at roughly the same location. In one embodiment the airplane hardware address correlation unit 416 can combine the crowd sourced data to improve accuracy of the airplane detection feature.

The harvesting process can be performed periodically (e.g., daily). Periodic harvesting enables the database to be continuously updated. If access point hardware within a plane or airport is replaced, the hardware addresses associated with the new access points will be recognized and classified. After a period of time of not being detected, old hardware addresses may be removed from the database. Periodically an updated set of airplane hardware address tiles 430 can be provided to the map tile data server 440.

Wireless Access Point Classification

Figure 5A:
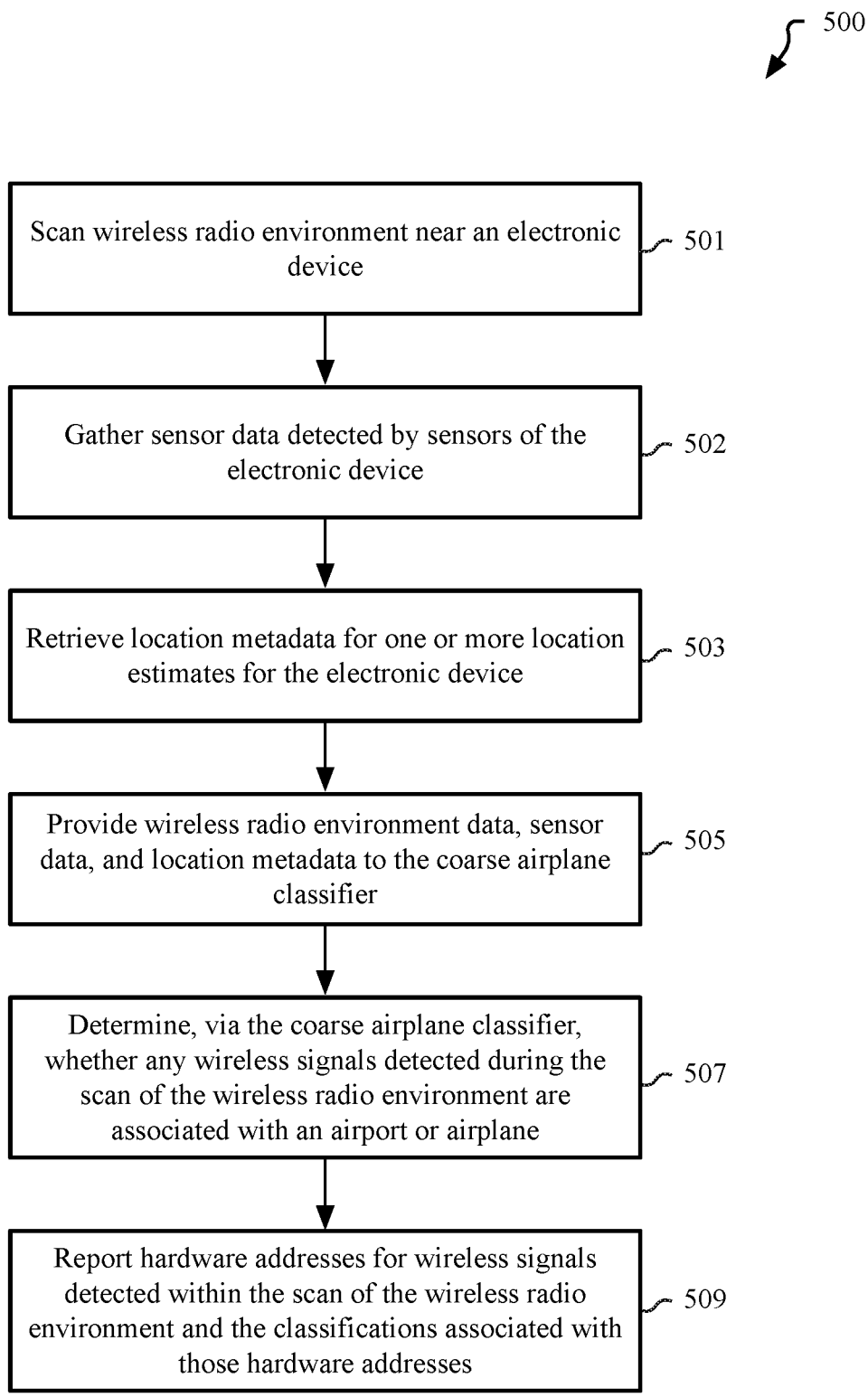
FIG. 5A-5B illustrate methods to perform coarse and real-time classification activities, according to embodiments described herein.
Figure 5B:
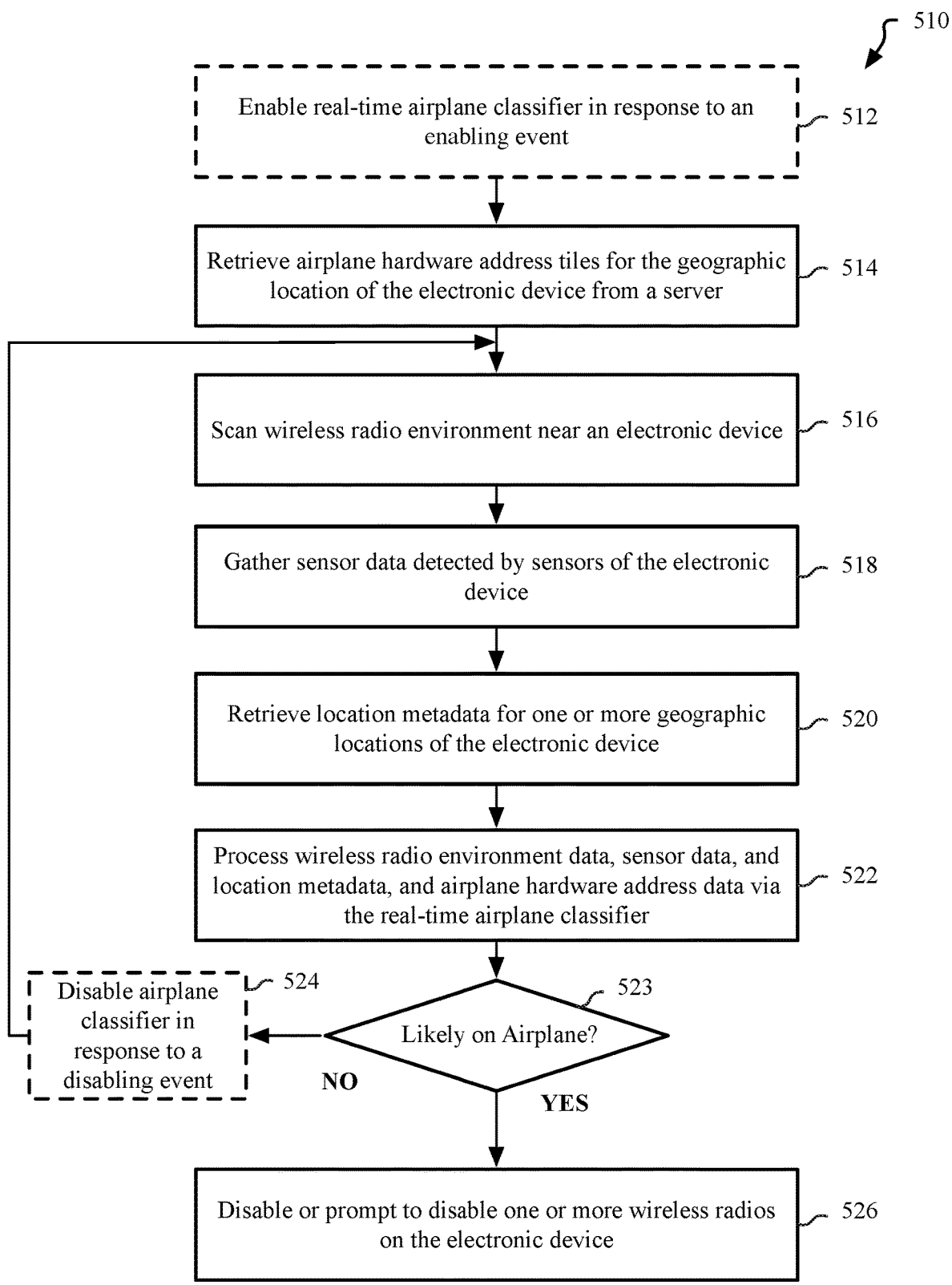

FIG. 5A-5B illustrate methods 500, 510 to perform coarse and real-time classification activities, according to embodiments described herein. The methods 500, 510 can be performed by an electronic device that is equipped with a system to perform airport and/or in-airplane detection, such as, for example, the system 300 of FIG. 3. FIG. 5A illustrates a method 500 of performing coarse airplane classification to detect wireless access points that are likely associated with an airport or airplane. FIG. 5B illustrates a method 510 of real-time airplane detection that enables an electronic device to determine whether the device is likely within an airplane. The electronic device described with respect to methods 500, 510 may be a smartphone device, a tablet device, an e-reader device, a personal digital assistant, a laptop device, or another type of mobile device or electronic device that includes an ultra-wide band ranging radio, a cellular radio, or another type of radio transmitter that may be required to be disabled on commercial passenger flights according to airplane flight regulations.

As shown in FIG. 5A, method 500 includes for an electronic device to scan the wireless radio environment near the electronic device (block 501). The electronic device can gather hardware addresses that are broadcast within radio signals that can be detected by the electronic device, such as but not limited Wi-Fi signals, Bluetooth signals, and other type of radio frequency signals. A location (e.g., geographic coordinate) in which the radio signal is detected can be correlated with the hardware addresses detected within the radio signals.

The electronic device can also gather sensor data detected by the electronic device (block 502). The sensor data can include barometric sensor data that enables the electronic device to correlate a barometric pressure reading with a detected wireless signal associated with a wireless network access point or another type of radio broadcast. The sensor data can also include accelerometer data that may be used, for example, to attempt to detect a motion profile that is consistent with an airplane during takeoff.

The electronic device can also retrieve location metadata for one or more location estimates for the electronic device (block 503). The location metadata can be used to enable the electronic device to determine specific details about the estimated geographic location of the electronic device, such as, for example, that the electronic device is at an airport.

The electronic device can then provide the wireless radio environment data, sensor data, and location metadata to the coarse airplane classifier (block 505). The electronic device can then determine, via the coarse airplane classifier, whether any of the wireless signals detected during the scan of the wireless radio environment are associated with an airport or airplane (block 507). For example, the wireless signals that were detected during the scan of the wireless radio environment may be wireless access points within an airport or wireless access points within an airplane. In some embodiments, the coarse airplane classifier can also classify wireless signals that may be associated with other types of radio broadcasts (e.g., Bluetooth beacons, etc.). The electronic device can then report hardware addresses for wireless signals detected within the scan of the wireless radio environment and the classifications associated with of those hardware addresses (block 509). The hardware addresses and classifications can be reported to a server during a wireless data harvest (e.g., wireless data harvest 340 reported to airplane classifier server 410 as in FIG. 4).

In one embodiment, the coarse airplane classifier can classify hardware addresses associated with stationary infrastructure wireless access points within a geographic region associated with airport polygon as being associated with that airport. Hardware addresses associated with wireless access points that are seen to be moving between airports can be classified as potentially or likely associated with airplane-based wireless transmitters. In one embodiment the coarse classifier can sample the hardware addresses detected within the wireless radio environment when a user manually enters airplane mode on the electronic device. A pressure detected by a barometric pressure sensor can also be analyzed when the user manually enters airplane mode on the electronic device. The recent location estimate of the electronic device can also referenced when airplane mode is manually entered. If the coarse airplane classifier determines that, at the time airplane mode was entered, the electronic device is at an airport and/or the detected barometric pressure is consistent with the cabin pressure of an airplane during takeoff or in-flight, the coarse airplane classifier can classify hardware addresses of detected wireless signals as airplane based hardware addresses. Additionally, airports and aircraft may have multiple access points having different hardware addresses and transmitting using the same identifier. Where multiple hardware addresses that are detected at a location at or near an airport and the multiple addresses are transmitting using the same identifier, each of those hardware addresses are likely to be associated with either the airport or an airplane at the airport. Other classification techniques can be used. The set of relevant hardware addresses and associated locations can be stored to airplane hardware address tiles that may be retrieved by client electronic devices. Data within the airplane hardware address tiles may be used by client electronic devices during real-time airplane classification.

As shown in FIG. 5B, method 510 optionally includes for the electronic device to enable real-time airplane classifier based on enabling event (block 512). In some embodiments the real-time classifier can be enabled, for example, when the electronic device is determined to be within an airport polygon within a mapping database or otherwise determined to be inside of an airport. In one embodiment, device or user context can be used to enable the real-time airplane classifier. For example, the presence of a calendar event that indicates that the user will be boarding a flight or the user taking a rideshare ride to an airport. In one embodiment, the presence of an airplane ticket in an electronic wallet of the electronic device or detected within e-mail of the user enable the determination of a user flight schedule and provide a hint for the triggering of the real-time airplane classifier.

In some embodiments, at least a portion of the operations of the real-time airplane classifier can operate continuously or periodically instead of being enabled in response to an enabling event.

In one embodiment the electronic device can retrieve airplane hardware address tiles for the geographic location of the electronic device (block 514). The airplane hardware address tiles can be retrieved, for example, immediately upon enabling the real-time airplane classifier in response to the enabling event. For example, when the electronic device detects the entry into an airport geofence, the set of airplane hardware address tiles that are relevant for the airport may be downloaded by the electronic device. The electronic device may also update a cached version of the airplane hardware address tiles. The airplane hardware address tiles include a set of hardware addresses that have been determined to be airport or airplane hardware addresses. The electronic device can compare the hardware addresses of any detected radio signals to the list of addresses in the airplane hardware address tiles.

The electronic device can also scan the nearby wireless radio environment (block 516). The scan can be performed to gather hardware addresses associated with detected wireless signals and to classify the density of the wireless signal environment (e.g., quiet, noisy). The electronic device can also gather sensor data detected by the electronic device (block 518). The sensor data can include, for example, barometric sensor data and/or accelerometer data. Accelerometer data that may be used, for example, to attempt to detect a motion profile that is consistent with an airplane during takeoff. A time series of barometric sensor data can be gathered, for example, to detect a change in pressure that is consistent an airplane during takeoff.

The electronic device can also retrieve location metadata for one or more geographic locations of the electronic device (block 520). In one embodiment, metadata for a current geographic location of an electronic device can be retrieved by accessing map tile metadata for the geographic location of the electronic device. The map tile metadata can be retrieved from a remote map tile database or a local (e.g., cached) subset of the map tile database. The metadata can include a classification of the current map tile or sub-tile (e.g., airport, runway, etc.) as well as a list of hardware addresses that have been classified as being associated with an airport or airplane. The map tile metadata can also include DEM data that indicates an elevation for the estimated geographic location. If an altitude can be determined by the electronic device based on GPS data, the expected ground altitude determined via the DEM data can compared with the detected GPS altitude to determine if there is a discrepancy between the detected and expected altitude. GPS reception for the electronic device may be limited when the device is inside of an airplane.

In one embodiment, DEM elevation can be analyzed in concert with barometric sensor data to detect a difference between a detected pressure an expected pressure. For example, the expected pressure at an altitude of the airport or runway can be compared with a time series of pressure readings. If the time series of pressure readings are consistent with the takeoff and ascent phase of an airplane, it is more likely that the electronic device is inside of an airplane. The specific change in pressure can vary based on the altitude of the runway and the pressurization altitude of the airplane. However, specific changes in pressure over specific time periods can be correlated with specific flight phases of an airplane.

The electronic device can then process wireless radio environment, sensor data, location metadata, and airplane hardware address data via the real-time airplane classifier (block 522). The wireless radio environment, sensor data, location metadata, and airplane hardware address data can be processed to determine whether the electronic device is likely on an airplane. The set of available radio signals and sensor data that can be analyzed for a given airplane state are shown in Table 1 below.

TABLE 1

Available Signals Given Aircraft State

| | In Terminal/ Boarding | Doors Close/ Taxiing to Runway | Take Off | Ascend | Cruising |
|---|---|---|---|---|---|
| Wi-Fi | Multiple aircraft APs visible | Onboard aircraft SPs enabled; Multiple aircraft visible | Onboard aircraft Aps enabled; Multiple aircrafts visible | | Additional Aps enabled; Quiet signal environment |
| Barometer | | Barometric effects from cabin pressurization | Time series consistent with takeoff | Time series consistent with ascent | Computed altitude compared to runway DEM |
| GPS/DEM | Cache DEM from detected locations | | | | GPS altitude data |
| Accelerometer | | | Sustained magnitude of acceleration vector increases | | |

The real-time airplane classifier on the electronic device can determine, based on the processing of the wireless signals and sensor data, whether the electronic device is likely on airplane. If the electronic device is determined to not likely be on an airplane (NO, block 523), the electronic device may optionally disable the airplane classifier in response to a disabling event (block 524), or may return to the data gather process (e.g., at block 516). The disabling event may be, for example, a timeout event or the manual entry of airplane mode by a user. If the electronic device is determined to likely be on an airplane (YES, block 523), the electronic device can disable or prompt to disable one or more wireless radios on the electronic device (block 526), for example, by entering airplane mode on the electronic device or explicitly disabling one or more wireless radios (e.g., cellular radio, ranging radio, etc.).

In one embodiment the coarse or real-time classifiers may be associated with one or more neural network models and machine learning can be used to train the neural network models of the classifiers to determine whether metrics associated with a detected hardware address indicates that the detected hardware address is associated with an airplane. The training data for the neural network model can include, for example, barometric sensor data, accelerometer data, wireless signal environment data, differences between detected GPS altitude and DEM altitude, and other data that may indicate that electronic device is in an airplane that is in a phase of flight.

In general, a reliable device side indicator of being in a moving vessel that is equipped with a Wi-Fi access point, or other type of network access point, is the notion of moving through a radio signal space. For example, as a device moves through a Wi-Fi space, the device will detect a constantly evolving set of signals and associated hardware (e.g., MAC) addresses. When the device is stationary, the device will likely detect a relatively constant set of hardware addresses. When an electronic device is in a moving vessel that is partially permeable to Wi-Fi signals, a first set of wireless signals having a first set of hardware addresses may be detected that have a consistent signal strength. Signals in the first set of wireless signals likely originate from within and/or are associated with the vessel. The electronic device may also detect a second set of wireless signals that are not stable from the standpoint of the electronic device. The second set of wireless signals may be unstable, with different hardware addresses and signal strengths over time. Signals in the second set of signals likely originate from outside of the vessel. Furthermore, due to the infrequency of changes to airplane-based network access points, access point enabled aircraft will likely maintain a static hardware address for a long period of time, enabling the correlation of airplane metrics over a period of time.

From the perspective of an electronic device that is being carried by a user that is sitting within an airplane that is parked at a gate, the electronic device will observe a relatively constant and stable set of hardware addresses. As the airplane departs the gate, an access point that is on airplane of the user will remain at a constant signal strength, while access point signals associated with other airplanes or the airport will begin to change. Using the set of hardware addresses that are known to be associated with airplane access points, the real-time airplane classifier can detect the specific phase at which the user and associated electronic device being moving away from the gate and taxiing through the airport taxiways. Additionally, at certain points during the airplane detection process that is performed by the real-time classifier, audio data detected via a microphone of an electronic device can be used to attempt to detect a unique audio signature associated with the inside of an airplane.

While engaging airplane mode is generally described herein, it will be understood that similar techniques can also be used to automatically disengage airplane mode after an aircraft lands. For example, upon detection of signal data and wireless radio environment metrics that are consistent with landing, taxiing, or arriving at a gate, the electronic device can be configured to automatically disengage airplane mode or automatically re-enable one or more wireless radios on the electronic device.

Figure 6A:
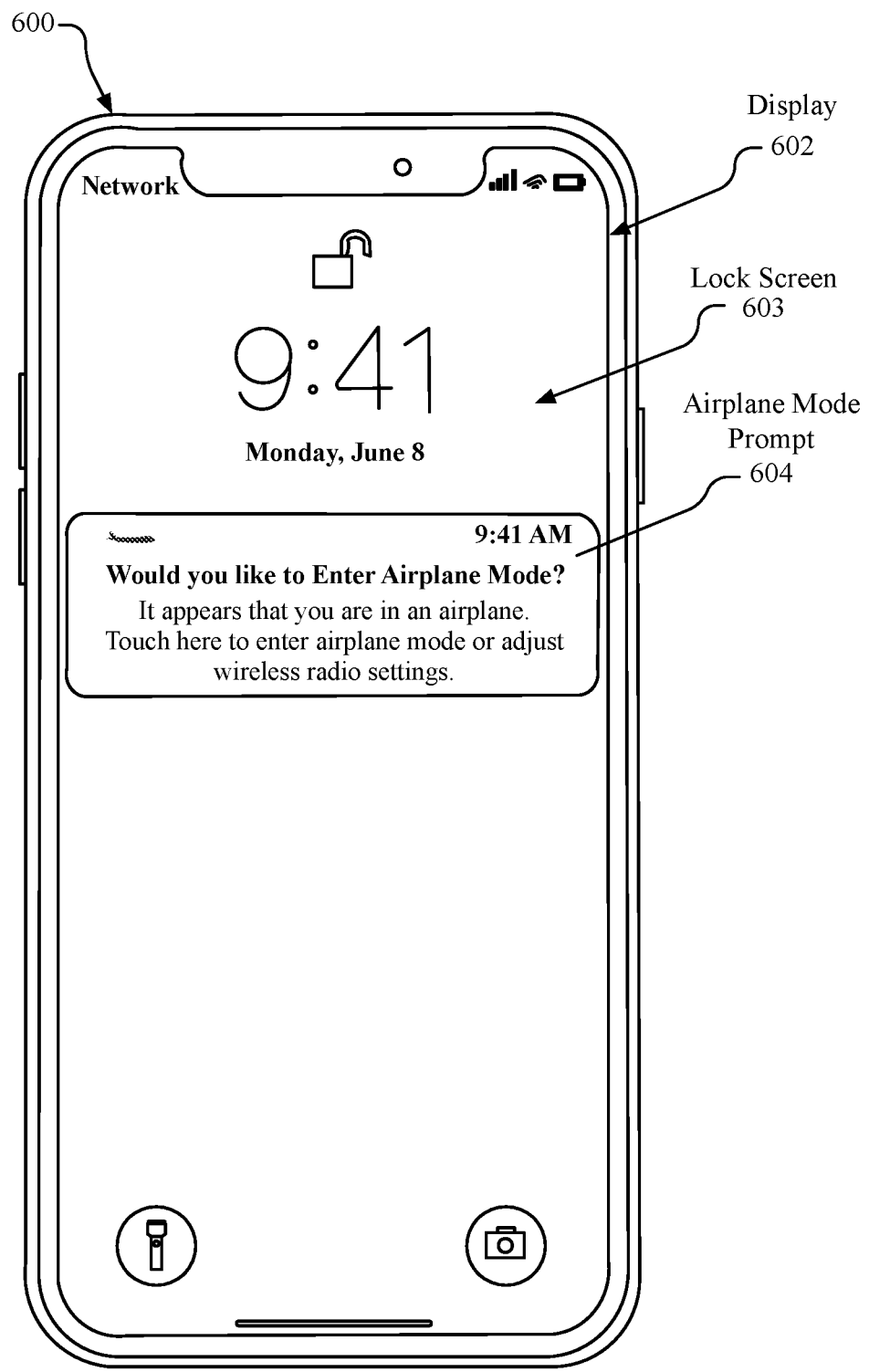
FIG. 6A-6C illustrate exemplary user interfaces related to the context-based disabling of wireless radios while on an airplane.
Figure 6B:
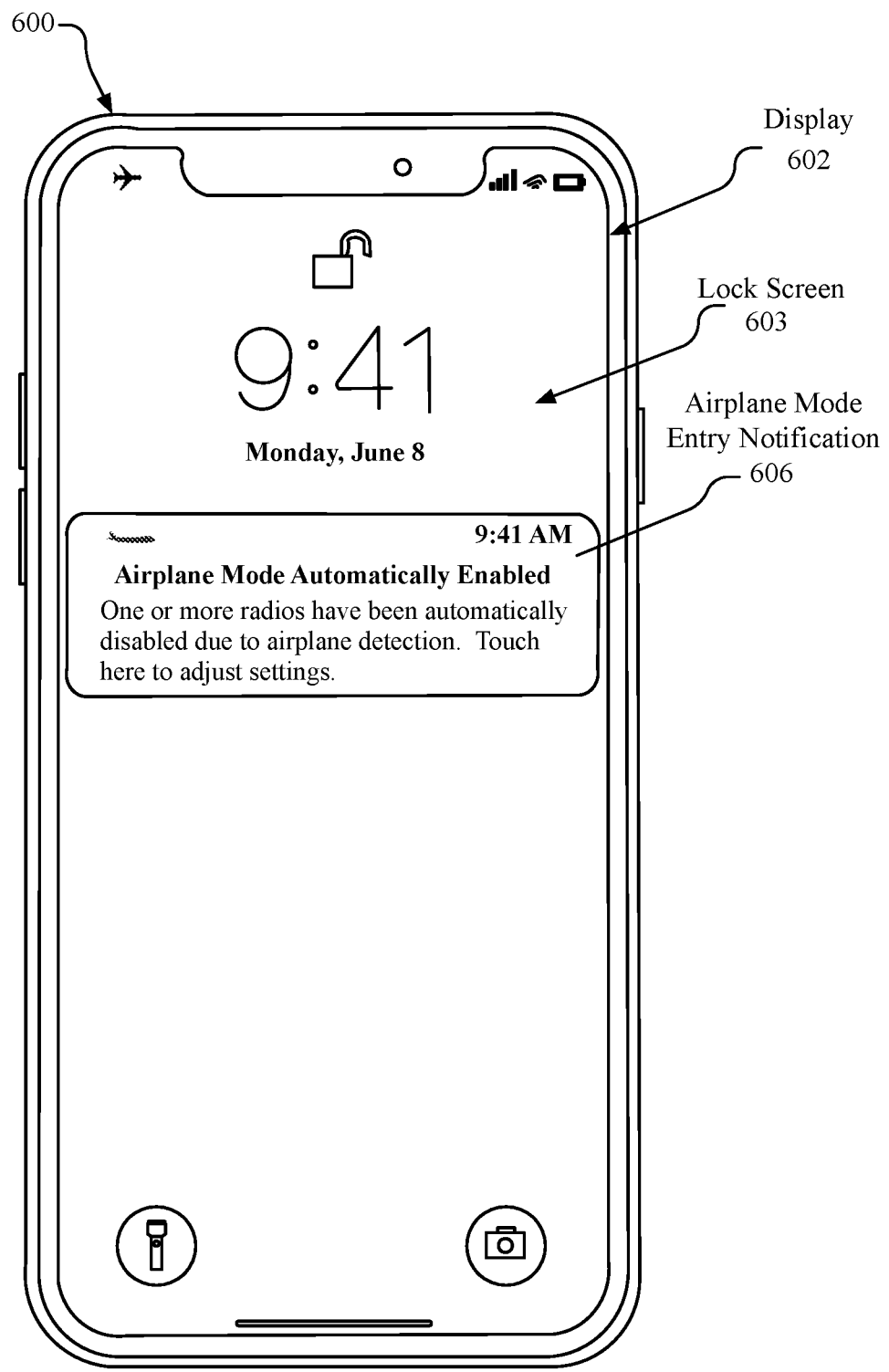
Figure 6C:
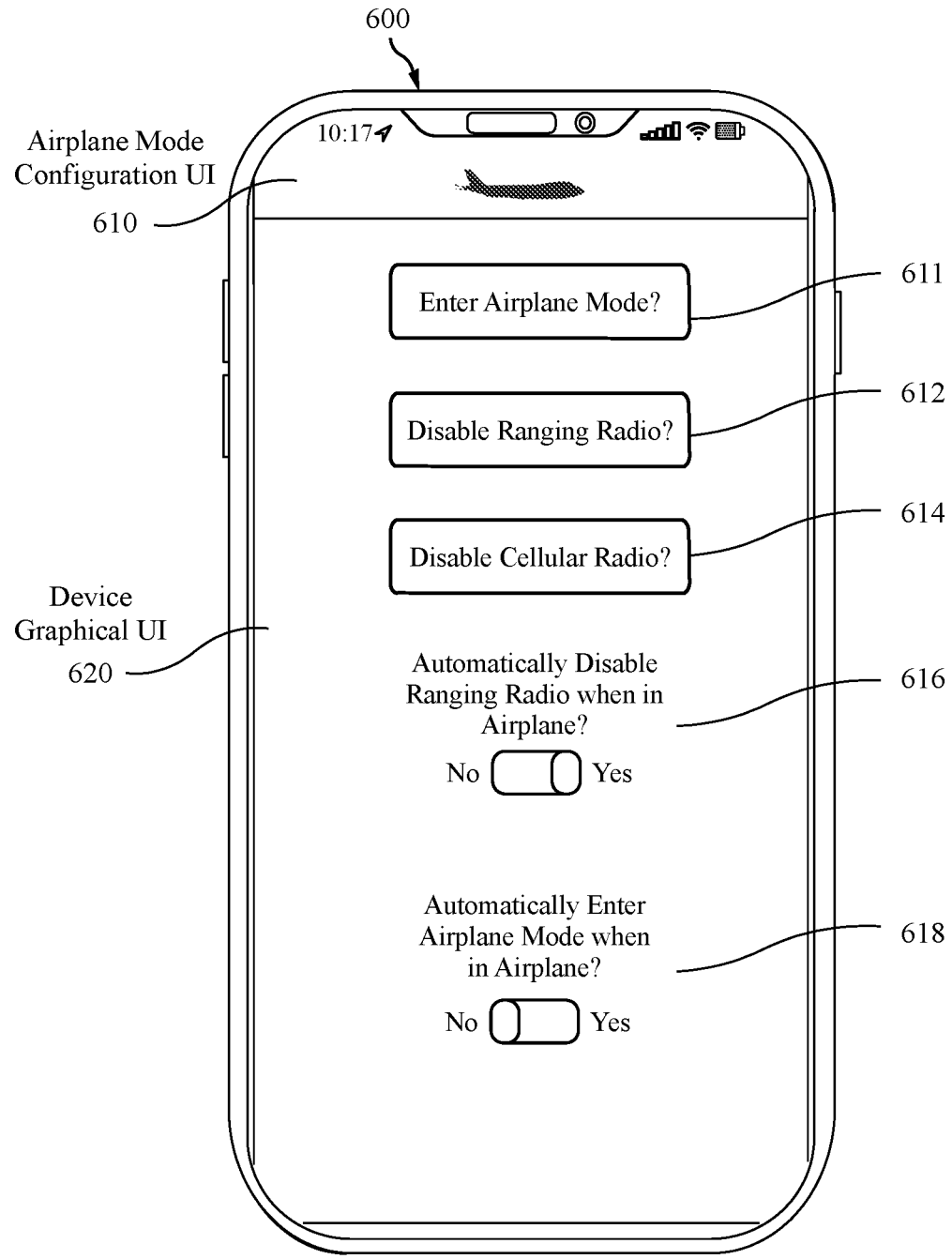

FIG. 6A-6C illustrate exemplary user interfaces related to the context-based disabling of wireless radios while on an airplane. The exemplary user interfaces can be displayed on an electronic device 600 to prompt a user to enter airplane mode, as shown in FIG. 6A, to inform the user that one or more wireless radios have been disabled, as shown in FIG. 6B, and enable a user to enter and/or configure airplane mode and configure the automatic disabling of radios on the electronic device.

As shown in FIG. 6A, an electronic device 600 can display an airplane mode prompt 604 that asks a user whether the user would like to enter airplane mode. The airplane mode prompt is displayed on a display 602 of the device in association with a graphical user interface of the electronic device 600. The airplane mode prompt 604 can indicate to the user that it appears that the user is in an airplane. A user can touch the airplane mode prompt 604 to be taken to a configuration screen (shown in FIG. 6C) to allow the user to enter airplane mode or adjust wireless radio settings. As illustrated, the airplane mode prompt 604 is displayed on a lock screen 603, although display of the prompt can occur during other operational modes of the electronic device 600.

As shown in FIG. 6B, the electronic device 600 can be configured to automatically enable airplane upon determination that the electronic device is in an airplane. An airplane mode entry notification 606 can be displayed to inform the user that one or more radios have been automatically disabled due to airplane detection. The user can touch the airplane mode entry notification 606 to be taken to a configuration screen that allows the user to adjust airplane mode settings.

As shown in FIG. 6C, an airplane mode configuration UI 610 can be shown on the device graphical user interface 620. The airplane mode configuration UI 610 can include a user interface element 611 to enable the user to enter airplane mode. The airplane mode configuration UI 610 can also include a user interface element 612 to enable the user to explicitly disable the ranging radio on the device. The airplane mode configuration UI 610 can also include a user interface element 614 to enable the user to explicitly disable the cellular radio on the device. Other interface elements to enable the disabling of other radios on the device may also be presented. In one embodiment, the airplane mode configuration UI 610 can include a user interface element 616 to enable the ranging radio of the electronic device to be automatically disabled when in an airplane. In one embodiment, the airplane mode configuration UI 610 can include a user interface element 618 to enable the electronic device to automatically enter airplane mode when in an airplane. Automatically entering airplane mode can disable the cellular radio of the device and potentially other radios of the device. In one embodiment, automatic entry of airplane mode or the automatic disabling of one or more radios can be performed only if the confidence level that the electronic device is in an airplane is very high. If the electronic device determines that the device is likely (but not certainly) inside of an airplane, the electronic device may prompt the user to disable the one or more radios or enter airplane mode instead of automatically disabling the one or more radios or automatically entering airplane mode.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the other set of APIs.

Figure 7:
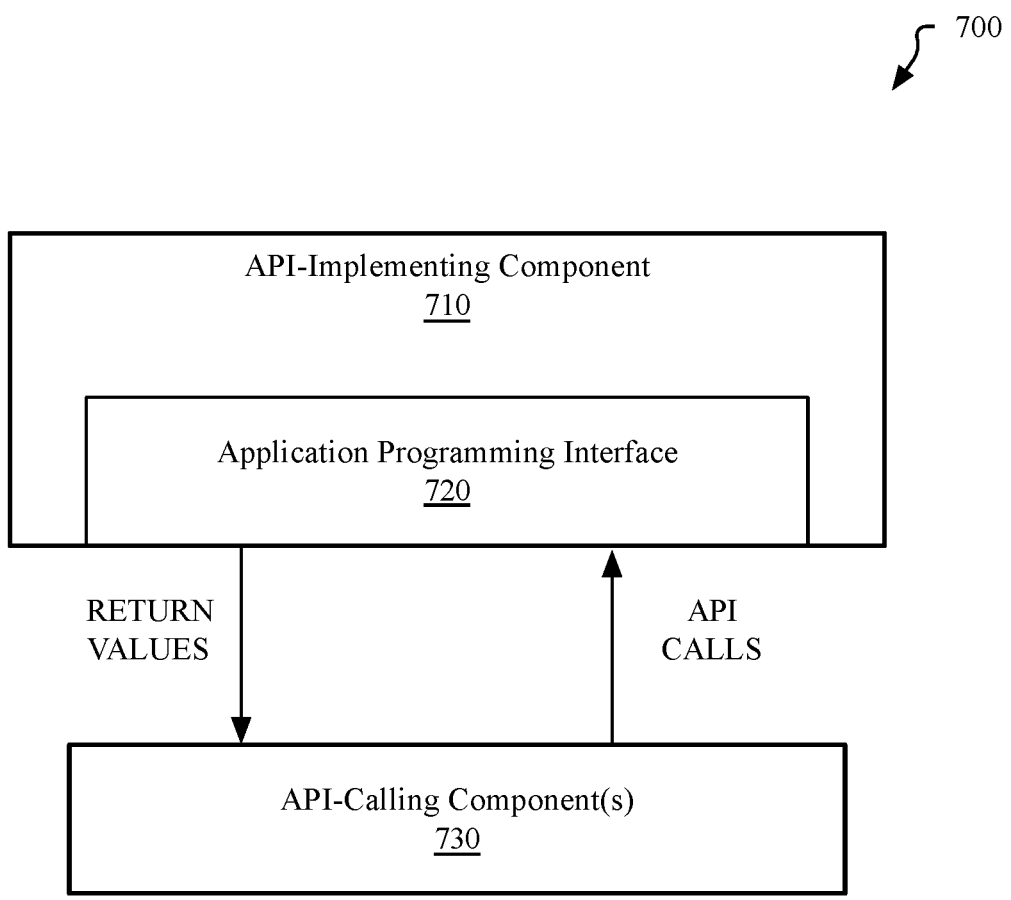
FIG. 7 is a block diagram illustrating an exemplary API architecture, which may be used in some embodiments.

FIG. 7 is a block diagram illustrating an exemplary API architecture, which may be used in some embodiments. As shown in FIG. 7, the API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates an API-calling component 730 interacting with the API 720, other API-calling components, which may be written in different languages (or the same language) than the API-calling component 730, may also use the API 720.

The API-implementing component 710, the API 720, and the API-calling component 730 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 8:
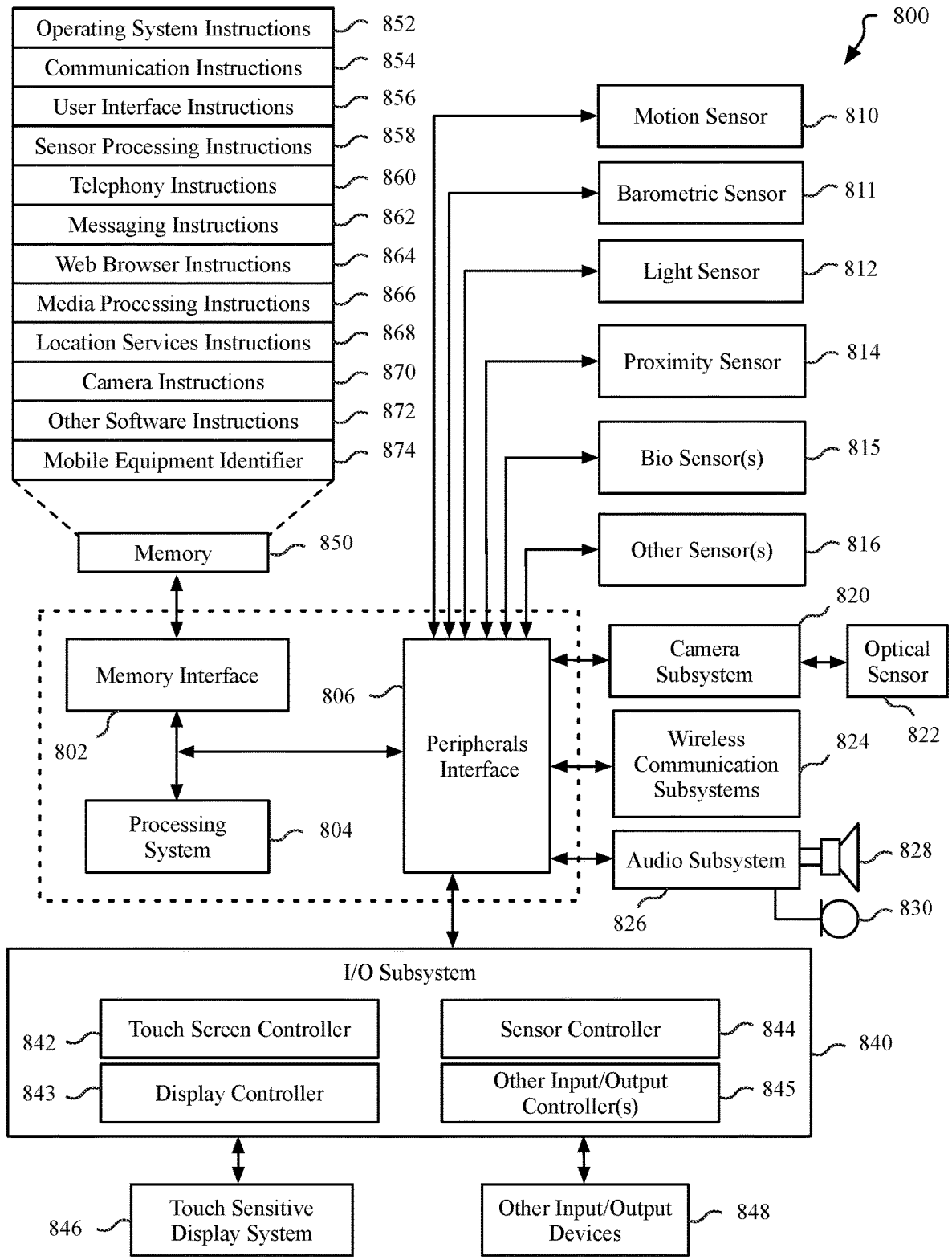
FIG. 8 is a block diagram of a device architecture for a mobile or embedded device, according to an embodiment.

FIG. 8 is a block diagram of a device architecture 800 for a mobile or embedded device, according to an embodiment. The device architecture 800 includes a memory interface 802, a processing system 804 including one or more data processors, image processors and/or graphics processing units, and a peripherals interface 806. The various components can be coupled by one or more communication buses or signal lines. The various components can be separate logical components or devices or can be integrated in one or more integrated circuits, such as in a system on a chip integrated circuit.

The memory interface 802 can be coupled to memory 850, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 806 to facilitate multiple functionalities. For example, a motion sensor 810, a barometric sensor 811, a light sensor 812, and a proximity sensor 814 can be coupled to the peripherals interface 806 to facilitate the mobile device functionality. One or more biometric sensor(s) 815 may also be present, such as a fingerprint scanner for fingerprint recognition or an image sensor for facial recognition. Other sensors 816 can also be connected to the peripherals interface 806, such as a positioning system (e.g., global positioning sensor (GPS) receiver), a temperature sensor, or other sensing device, to facilitate related functionalities. A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through wireless communication subsystems 824, which can include radio frequency receivers and transmitters and/or optical (e.g., infrared) receivers and transmitters. The specific design and implementation of the wireless communication subsystems 824 can depend on the communication network(s) over which a mobile device is intended to operate. For example, a mobile device including the illustrated device architecture 800 can include wireless communication subsystems 824 designed to operate over a GSM network, a CDMA network, an LTE network, a Wi-Fi network, a Bluetooth network, or any other wireless network. In particular, the wireless communication subsystems 824 can provide a communications mechanism over which a media playback application can retrieve resources from a remote media server or scheduled events from a remote calendar or event server.

An audio subsystem 826 can be coupled to a speaker 828 and a microphone 830 to facilitate voice-enabled functions, such as voice recognition, voice replication, digital recording, and telephony functions. In smart media devices described herein, the audio subsystem 826 can be a high-quality audio system including support for virtual surround sound.

The I/O subsystem 840 can include a touch screen controller 842 and/or other input controller(s) 845. For computing devices including a display device, the touch screen controller 842 can be coupled to a touch sensitive display system 846 (e.g., touchscreen). The touch sensitive display system 846 and touch screen controller 842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 846. Display output for the touch sensitive display system 846 can be generated by a display controller 843. In one embodiment, the display controller 843 can provide frame data to the touch sensitive display system 846 at a variable frame rate.

In one embodiment, a sensor controller 844 is included to monitor, control, and/or processes data received from one or more of the motion sensor 810, light sensor 812, proximity sensor 814, or other sensors 816. The sensor controller 844 can include logic to interpret sensor data to determine the occurrence of one of more motion events or activities by analysis of the sensor data from the sensors.

In one embodiment, the I/O subsystem 840 includes other input controller(s) 845 that can be coupled to other input/control devices 848, such as one or more buttons, rocker switches, thumb-wheel, infrared port, USB port, and/or a pointer device such as a stylus, or control devices such as an up/down button for volume control of the speaker 828 and/or the microphone 830.

In one embodiment, the memory 850 coupled to the memory interface 802 can store instructions for an operating system 852, including portable operating system interface (POSIX) compliant and non-compliant operating system or an embedded operating system. The operating system 852 may include instructions for handling basic system services and for performing hardware dependent tasks. In some implementations, the operating system 852 can be a kernel.

The memory 850 can also store communication instructions 854 to facilitate communicating with one or more additional devices, one or more computers and/or one or more servers, for example, to retrieve web resources from remote web servers. The memory 850 can also include user interface instructions 856, including graphical user interface instructions to facilitate graphic user interface processing.

Additionally, the memory 850 can store sensor processing instructions 858 to facilitate sensor-related processing and functions; telephony instructions 860 to facilitate telephone-related processes and functions; messaging instructions 862 to facilitate electronic-messaging related processes and functions; web browser instructions 864 to facilitate web browsing-related processes and functions; media processing instructions 866 to facilitate media processing-related processes and functions; location services instructions including GPS and/or navigation instructions 868 and Wi-Fi based location instructions to facilitate location based functionality; camera instructions 870 to facilitate camera-related processes and functions; and/or other software instructions 872 to facilitate other processes and functions, e.g., security processes and functions, and processes and functions related to the systems. The memory 850 may also store other software instructions such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. A mobile equipment identifier, such as an International Mobile Equipment Identity (IMEI) 874 or a similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions may be implemented in hardware and/or in software, including in one or more signal processing and/or application specific integrated circuits.

Figure 9:
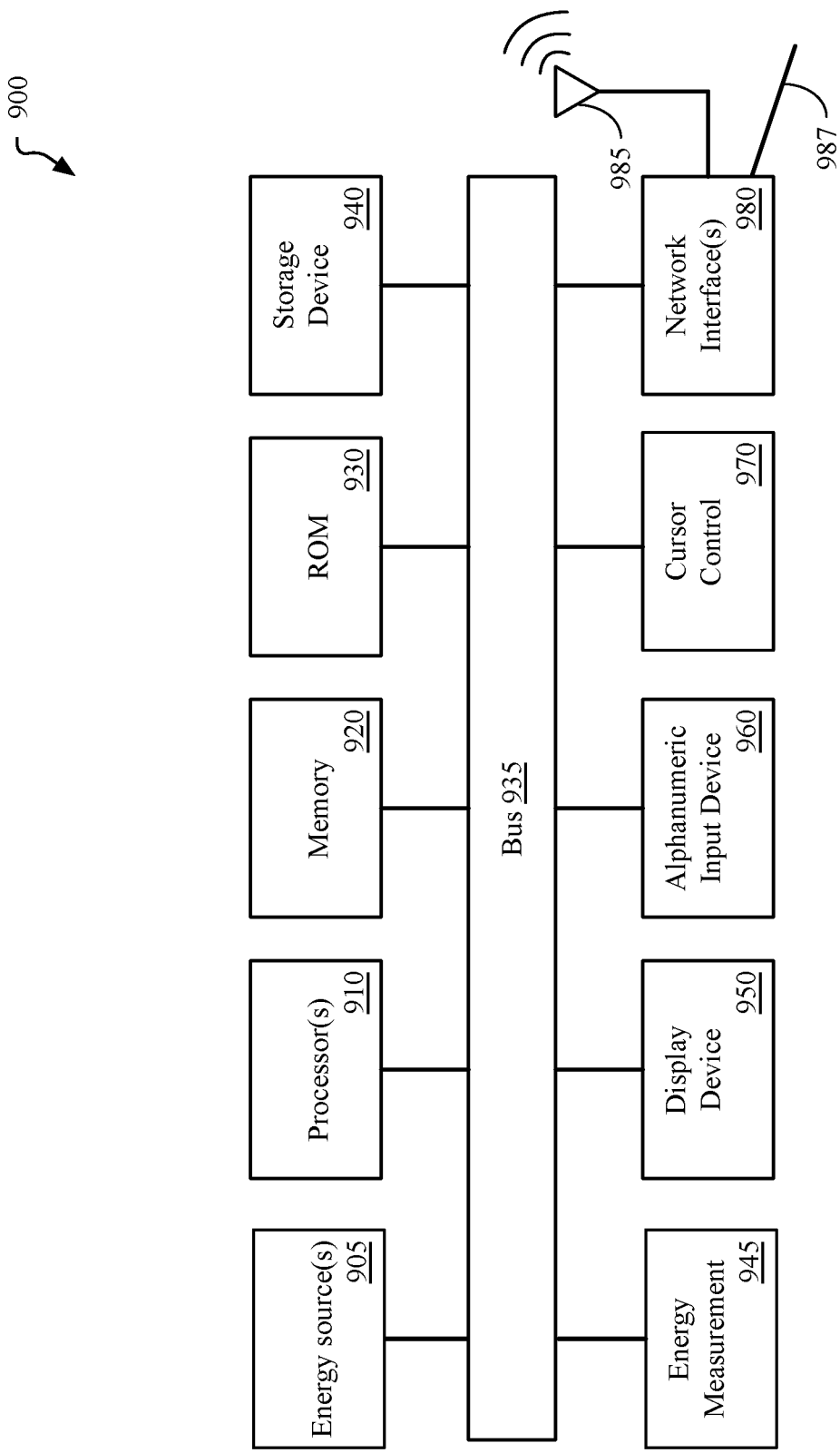
FIG. 9 is a block diagram of a computing system, according to an embodiment

FIG. 9 is a block diagram of a computing system 900, according to an embodiment. The illustrated computing system 900 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 900 can be used to provide the computing device and/or a server device to which the computing device may connect.

The computing system 900 includes bus 935 or other communication device to communicate information, and processor(s) 910 coupled to bus 935 that may process information. While the computing system 900 is illustrated with a single processor, the computing system 900 may include multiple processors and/or co-processors. The computing system 900 further may include memory 920 in the form of random-access memory (RAM) or other dynamic storage device coupled to the bus 935. The memory 920 may store information and instructions that may be executed by processor(s) 910. The memory 920 may also be main memory that is used to store temporary variables or other intermediate information during execution of instructions by the processor(s) 910.

The computing system 900 may also include read only memory (ROM) 930 and/or another data storage device 940 coupled to the bus 935 that may store information and instructions for the processor(s) 910. The data storage device 940 can be or include a variety of storage devices, such as a flash memory device, a magnetic disk, or an optical disc and may be coupled to computing system 900 via the bus 935 or via a remote peripheral interface.

The computing system 900 may also be coupled, via the bus 935, to a display device 950 to display information to a user. The computing system 900 can also include an alphanumeric input device 960, including alphanumeric and other keys, which may be coupled to bus 935 to communicate information and command selections to processor(s) 910. Another type of user input device includes a cursor control 970 device, such as a touchpad, a mouse, a trackball, or cursor direction keys to communicate direction information and command selections to processor(s) 910 and to control cursor movement on the display device 950. The computing system 900 may also receive user input from a remote device that is communicatively coupled via one or more network interface(s) 980.

The computing system 900 further may include one or more network interface(s) 980 to provide access to a network, such as a local area network. The network interface(s) 980 may include, for example, a wireless network interface having antenna 985, which may represent one or more antenna(e). The computing system 900 can include multiple wireless network interfaces such as a combination of Wi-Fi, Bluetooth®, near field communication (NFC), and/or cellular telephony interfaces. The network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, the network interface(s) 980 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 900 can further include one or more energy sources 905 and one or more energy measurement systems 945. Energy sources 905 can include an AC/DC adapter coupled to an external power source, one or more batteries, one or more charge storage devices, a USB charger, or other energy source. Energy measurement systems include at least one voltage or amperage measuring device that can measure energy consumed by the computing system 900 during a predetermined period of time. Additionally, one or more energy measurement systems can be included that measure, e.g., energy consumed by a display device, cooling subsystem, Wi-Fi subsystem, or other frequently used or high-energy consumption subsystem.

Reference herein to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow can be performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the embodiments described herein. However, it will be apparent to one of ordinary skill in the art that the presently described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact. The first contact and the second contact are both contacts, but they are not the same contact.

The terminology used herein is for the purpose of describing particular embodiments only and is not intended to be limiting as to all embodiments. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

The embodiments described above provide for an electronic device comprising a set of classifiers that can determine whether the electronic device is likely on an airplane. Upon a determination that the electronic device is likely on an airplane, one or more wireless radios on the electronic device (e.g., an ultra-wideband ranging radio, a cellular radio, etc.) may be disabled or a prompt can be displayed to enable a user to place the device into airplane mode.

One embodiment provides for a method comprising, on an electronic device having a wireless processor coupled with a wireless radio, scanning a wireless radio environment near an electronic device to gather wireless radio environment data. The method additionally includes gathering sensor data detected by sensors of the electronic device, retrieving location metadata for one or more location estimates for the electronic device, and providing the wireless radio environment data, sensor data, and location metadata to a coarse airplane classifier on the electronic device. The coarse airplane classifier can determine a classification for wireless signals detected during the scan of the wireless radio environment. The classification can indicate whether a wireless signal detected during the scan is associated with an airplane. The method additionally includes reporting hardware addresses for wireless signals detected within the scan of the wireless radio environment and classifications associated with the wireless signals to a server. The server can use the reported data to generate map metadata including reporting hardware addresses for wireless signals and an associated classification that indicates whether a wireless signal is likely associated with an airplane.

One embodiment provides for a method comprising, on an electronic device having a wireless processor coupled with a wireless radio, retrieving an airplane hardware address tile for a geographic location of the electronic device, where the airplane hardware address tile includes a set of hardware addresses associated with a wireless access point of an airplane. The method further includes scanning a wireless radio environment near an electronic device to gather wireless radio environment data, gathering sensor data detected by sensors of the electronic device, retrieving location metadata for one or more geographic locations of the electronic device, and processing the wireless radio environment data, the sensor data, the location metadata, and the airplane hardware address data via a real-time airplane classifier on the electronic device. The real-time airplane classifier determines whether the electronic device is likely on an airplane. When the real-time airplane classifier determines that the electronic device is likely on an airplane, the classifier can disable one or more wireless radios on the electronic device based on the determination.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A method comprising:
on an electronic device having a wireless processor coupled with a wireless radio:
scanning a wireless radio environment near the electronic device to gather wireless radio environment data, wherein the wireless radio environment data includes hardware addresses associated with detected radio signals within the wireless radio environment;
gathering sensor data detected by sensors of the electronic device;
retrieving location metadata for one or more location estimates for the electronic device;
providing the wireless radio environment data, sensor data, and location metadata to a coarse airplane classifier on the electronic device;
determining, via the coarse airplane classifier, a classification for wireless signals detected during a scan of the wireless radio environment, wherein the classification is to indicate whether a wireless signal detected during the scan is associated with an airplane; and
reporting wireless signals detected within the scan of the wireless radio environment and classifications associated with the wireless signals to a server configured to generate map metadata including an associated classification that indicates whether a wireless signal is likely associated with an airplane.

2. The method as in claim 1, wherein the detected radio signals include Wi-Fi radio signals or Bluetooth radio signals.

3. The method as in claim 1, wherein the sensor data detected by sensors of the electronic device includes barometric sensor data.

4. The method as in claim 3, wherein determining the classification for wireless signals detected during the scan of the wireless radio environment includes detecting, via the barometric sensor data, barometric effects associated with cabin pressurization of an airplane.

5. The method as in claim 4, wherein determining the classification for wireless signals detected during the scan of the wireless radio environment includes detecting, via the barometric sensor data, a time series of pressure readings that are consistent with takeoff and ascent of an airplane.

6. The method as in claim 1, wherein the sensor data detected by sensors of the electronic device includes accelerometer data.

7. The method as in claim 6, wherein determining the classification for wireless signals detected during the scan of the wireless radio environment includes detecting, via the accelerometer data, a sustained magnitude of increase in an acceleration vector that is consistent with an airplane takeoff.

8. The method as in claim 1, wherein retrieving location metadata for the one or more location estimates includes accessing map tile metadata for a geographic region of the electronic device from a map tile database.

9. The method as in claim 8, wherein determining the classification for wireless signals detected during the scan of the wireless radio environment includes determining, via the location metadata for the one or more location estimates, that the wireless signals were detected while the electronic device was at or near an airport.

10. An electronic device comprising:
a wireless processor coupled with a wireless radio, the wireless processor to determine, via the wireless radio, data for a wireless radio environment near the electronic device;
sensors to gather sensor data from a physical environment near the electronic device;
a location determination system to determine a geographic location of the electronic device;
a memory; and
one or more processors to execute instructions stored in the memory, wherein the instructions cause the one or more processors to:
retrieve location metadata for the geographic location of the electronic device, the location metadata including map tile metadata and an airplane hardware address tile, wherein the airplane hardware address tile includes a set of hardware addresses associated with a wireless access point of an airplane;
process the data for the wireless radio environment, the sensor data, the location metadata, and the airplane hardware address tile via a real-time airplane classifier on the electronic device to determine whether the electronic device is likely on an airplane; and
disable one or more wireless radios on the electronic device based on a determination that the electronic device is likely on an airplane.

11. The electronic device as in claim 10, wherein the one or more processors are to enable the real-time airplane classifier in response to an enabling event and the real-time airplane classifier is associated with one more neural network models.

12. The electronic device as in claim 11, wherein the enabling event is based on the geographic location of the electronic device or a context associated with a user of the electronic device.

13. The electronic device as in claim 11, wherein the one or more processors, in response to the enabling event, are to retrieve the airplane hardware address tile.

14. The electronic device as in claim 13, wherein the data for the wireless radio environment includes hardware addresses associated with detected radio signals within the wireless radio environment.

15. The electronic device as in claim 14, wherein to determine that the electronic device is likely on an airplane, the one or more processors to are to compare the hardware addresses associated with the detected radio signals to the set of hardware addresses in the airplane hardware address tile.

16. The electronic device as in claim 14, wherein to determine that the electronic device is likely on an airplane, the one or more processors to are to:
determine that the data for the wireless radio environment includes a first set of wireless signals and a second set of wireless signals, wherein the first set of wireless signals includes a first set of hardware addresses with a consistent signal strength and the second set of wireless signals includes a second set of hardware addresses with inconsistent signal strength; and
determine that the first set of hardware addresses includes a hardware address in the set of hardware addresses associated with a wireless access point of an airplane.

17. The electronic device as in claim 14, wherein to determine that the electronic device is likely on an airplane, the one or more processors to are to:
determine, from the geographic location of the electronic device and the location metadata, that the electronic device is within an airport geofence;
determine that the data for the wireless radio environment includes a first set of wireless signals and a second set of wireless signals, wherein the first set of wireless signals includes a first set of hardware addresses with a consistent signal strength and the second set of wireless signals includes a second set of hardware addresses with inconsistent signal strength; and
determine that the sensor data includes barometric and accelerometer data consistent with takeoff and ascent of an airplane.

18. The electronic device as in claim 17, wherein to determine that the electronic device is likely on an airplane, the one or more processors to are to further to:
determine that an altitude detected via the location determination system differs from the altitude of the geographic location indicated by a digital elevation model of the geographic location.

19. The electronic device as in claim 10, wherein disabling one or more wireless radios on the electronic device, the one or more processors to are to:
present a notification via a graphical interface of the electronic device that the electronic device is likely on an airplane:
disabling the one or more wireless radios on the electronic device in response to an input received via the graphical interface to disable the one or more wireless radios.

20. The electronic device as in claim 19, wherein disabling one or more wireless radios on the electronic device includes to automatically disable a wireless ranging radio on the electronic device based on the determination that the electronic device is likely on an airplane.

\* \* \* \* \*